Feb. 26, 1929.                                         1,703,200
                       J. S. McWHIRTER
                         LATHE CHUCK
                   Filed Nov. 3, 1925           2 Sheets-Sheet 1
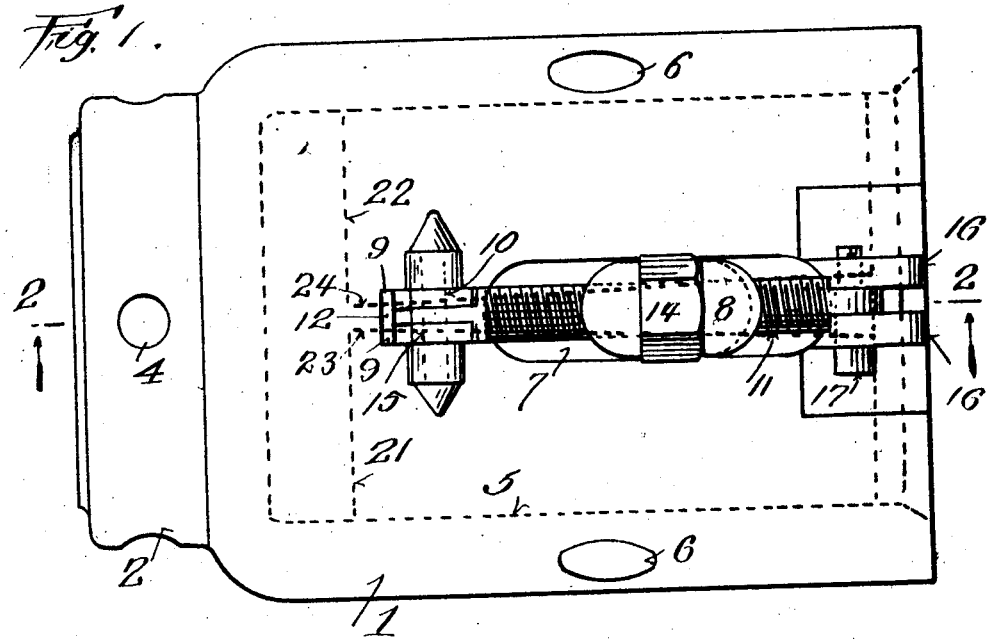
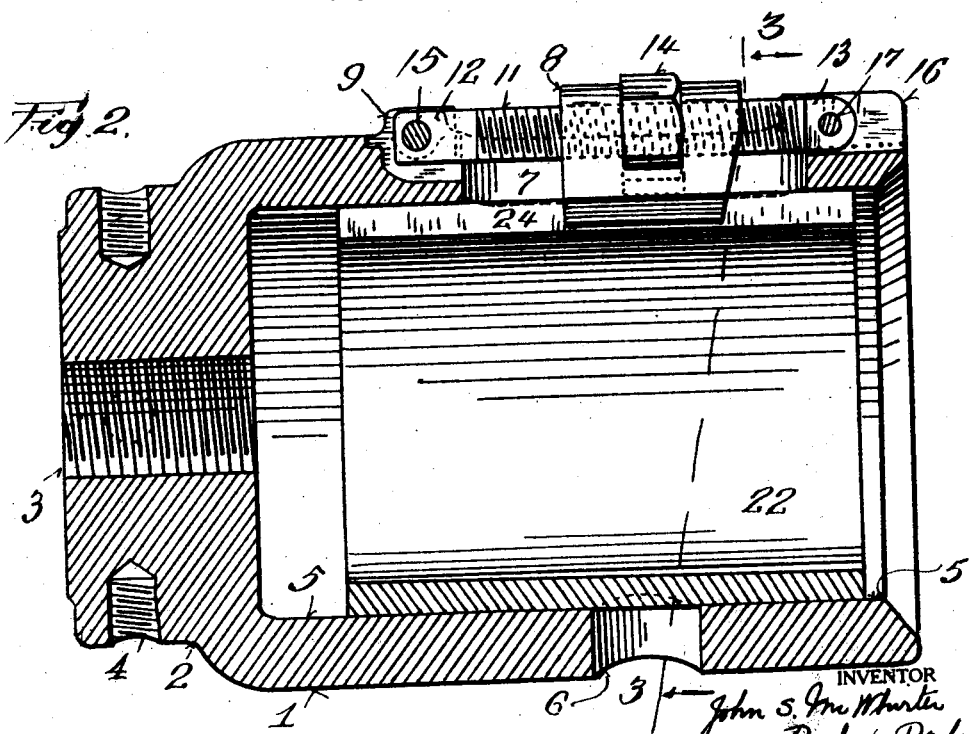
INVENTOR
John S. McWhirter
BY Darby & Darby
his ATTORNEYS

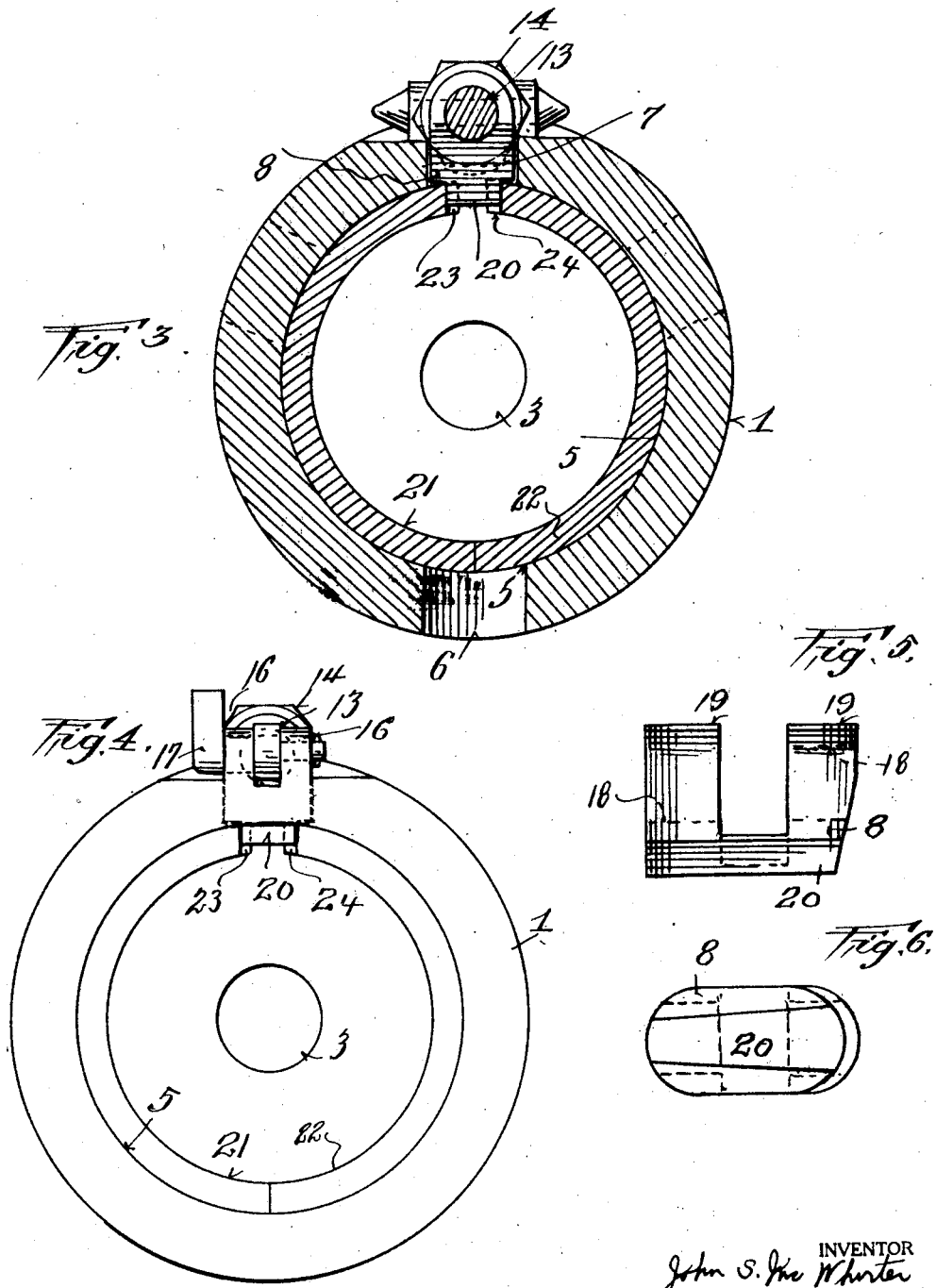

Patented Feb. 26, 1929.

1,703,200

UNITED STATES PATENT OFFICE.

JOHN S. McWHIRTER, OF SOUTHPORT, CONNECTICUT.

LATHE CHUCK.

Application filed November 3, 1925. Serial No. 66,446.

The general purpose of this invention is to provide a lathe chuck of special construction.

A more particular object is to provide a special lathe chuck to be used in holding bearing brasses and similar hollow articles made in sections for purposes of boring or turning the interior.

Another object of this invention is to provide a lathe chuck for holding bearing brasses of the type disclosed in my copending application, Serial No. 728,825, filed July 29, 1924, which is characterized by the feature that one of the two sets of abutting edges of the halves, which compose a complete bearing lining, are cut away to form a tapered channel between the tapered edges. It is evident that such bearing lining would be very difficult to secure in proper position for finishing in a lathe.

A still further object is to provide a chuck which is simple, efficient and convenient for quickly turning the interior of bearing brasses.

Other objects obtained by this invention will appear in the description below.

The invention resides substantially in the construction, combination, arrangement and relative location of parts which will now be more fully disclosed and then enumerated in the appended claims.

Referring to the drawings in which the same reference numerals are used throughout to indicate the same parts in all the views:—

Figure 1 is a top plan view of the chuck showing the means for binding the bearing brasses in place.

Figure 2 is a vertical sectional view taken on the line 2—2 of Figure 1, looking in the direction of the arrows, showing one of the brasses in place.

Figure 3 is a sectional view of the chuck with the brasses in place, taken on the line 3—3 of Figure 2, looking in the direction of the arrows.

Figure 4 is an end elevational view of the chuck with bearing brasses in place, looking into the large end of the chuck.

Figure 5 is a side elevational view of the sliding wedge key for clamping the brasses in the chuck.

Figure 6 is a bottom plan view of this wedge key.

The chuck is shown composed of the cylindrical portion 1 having a cylindrical hub 2 through which is provided a central threaded bore 3, into which the lathe spindle is to be screwed. This hub is also provided with radial recesses 4, to be used in receiving a bar or wrench for removal of the chuck from the lathe spindle.

The cylindrical body 1 is hollowed at 5 to produce a hollow shell as shown in the drawings of an internal diameter of substantially the same as that of the outside diameter of the brass or member when in finished form, so that when the brass or other bearing member is expanded into the chamber of the body 1, and is internally bored, it automatically attains its exact ultimate outside diameter, this result being secured by the brass or bearing member being made to conform exteriorly to the fixed inside diameter of the shell member 1, by being expanded into it.

The wall of the chuck, if desired, may be provided with openings 6, for permitting borings or chips to fall through during the boring of the sleeves or bearing member. For this purpose three openings 6 may be located opposite the usual oil holes ordinarily found in the brass or bearing member.

The hollow chuck wall is also provided with a longitudinal slot 7 which receives the sliding wedge key 8 which will be described later.

At the end of the slot 7 nearest the hub 2 are two upstanding lugs 9, 9 having holes 10 therethrough. A threaded rod 11, having a reduced portion 12 at one end which fits between the lugs 9, 9 and a reduced portion 13 at the other end, is adapted to receive the nut 14.

The reduced end 12 is pivotally mounted between the lugs 9, 9 on a short pin 15, while the reduced end 13 is adapted to be held between lugs 16, 16 on the free end of the chuck by a short locking pin 17.

The sliding wedge key 8 is U-shaped, and has axially aligned holes 18, 18 in the arms 19, 19. The bottom portion 20 of the wedge is tapered, as shown in Figure 6. The wedge key 8 slides on the rod 11, and is constrained in its motion by the nut 14 which rides in the channel between the arm 19, 19.

The device operates as follows:—

The two halves 21 and 22 of the bearing lining having the tapered edges 23 and 24 respectively are placed in the chuck, after the pin 17 is withdrawn, and the rod 11 is swung upwards about the pivot pin 15, so that the tapered edges 23 and 24 lie under the slot 7 in the chuck wall. The wedge key 8 is put in place so that the tapered edge 20 lies in the tapered slot between the opposed edges of the brass or bearing member to be bored. The rod 11 is then swung back into position so that the nut lies between the arms 19, 19 of the key, and the pin 17 is put in place. The nut 14 is finally rotated until the wedge key 8 expands the bearing against the interior of the chuck.

It will thus be evident that I have produced by means of this invention a very simple device of particular value for turning the bearing surfaces of brasses or sleeves employed for shaft or axle bearings. The bearing brass can be made in a single piece with a longitudinal slot, if desired.

While I have shown my invention as applied to boring a two-part bearing brass or sleeve which is slotted longitudinally, I am not to be limited in this respect, since it is equally well adapted for use in connection with brasses or sleeves made in one part.

It will be evident to one skilled in the art that many changes and modifications may be made within the spirit and scope of my invention, which I will now claim.

What I seek to secure by United States Letters Patent is:—

1. In a lathe chuck of the character described, a hollow body portion having a slot therein, means in said slot for expanding the work within said hollow portion comprising a sliding wedge.

2. In a lathe chuck of the character described, a hollow cylindrical portion having a slot in its wall, a wedge shaped key slidable in said slot, a threaded rod overlying said slot, a nut on said rod adapted to cause said wedge key to slide in said slot.

3. In a lathe chuck of the type described, a body portion having an opening therein, a wedge slidable in said opening, a hinged rod overlying said opening, a nut on said rod adapted to turn in a groove on said wedge whereby said wedge may be moved.

4. In a lathe chuck of the type described comprising a hollow body portion having an elongated slot therein, a threaded rod hinged on said body portion, so as to overlie said slot, wedge means in said slot for clamping work in the chuck, means on said rod to cause said wedge to move in said slot, and means to secure said rod in operative position.

5. The combination with a chuck having a cylindrical chamber adapted to receive therein a bearing member or sleeve, said chuck having a longitudinal slot through the wall thereof, of a wedge key slidably mounted in said slot, and being provided with a tapered projection to engage the tapered edges of a slot in the bearing member.

6. The combination with a chuck having a chamber adapted to receive therein a bearing member or sleeve, said chuck having a longitudinal slot through the wall thereof, of a wedge block slidably mounted in said slot, and a hinged threaded member mounted on said body above said slot, said block being slidable on said hinged member, and being provided with a tapered projection to engage the tapered edges of a slot in the bearing member.

7. The combination with a chuck having a chamber adapted to receive therein a bearing member or sleeve, said chuck having a longitudinal slot through the wall thereof, of a wedge block slidably mounted in said slot, a hinged member mounted over said slot, and means for clamping said hinged member in operative position over said slot, said wedge being slidable on said hinged member, and being provided with a tapered projection to engage the tapered edges of a slot in the bearing member.

In testimony whereof I have hereunto set my hand on this 26th day of October, A. D. 1925.

JOHN S. McWHIRTER.